United States Patent
Matsunaga (10) Patent No.: US 11,569,977 B1
(45) Date of Patent: Jan. 31, 2023

(54) RECEIVING DEVICE, MEMORY SYSTEM, AND METHOD

(71) Applicant: Kioxia Corporation, Tokyo (JP)

(72) Inventor: Shoun Matsunaga, Tokyo (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/685,858

(22) Filed: Mar. 3, 2022

(30) Foreign Application Priority Data

Sep. 21, 2021 (JP) ............................. JP2021-153383

(51) Int. Cl.
*H04L 7/033* (2006.01)

(52) U.S. Cl.
CPC .................................. *H04L 7/033* (2013.01)

(58) Field of Classification Search
CPC ..... H04L 7/033; H04L 7/0334; H04L 7/0337; H04L 7/04; H04L 7/06
USPC ................ 375/354, 355, 362, 364; 370/503; 327/141, 144
See application file for complete search history.

(56) References Cited

U.S. PATENT DOCUMENTS

| | | | |
|---|---|---|---|
| 9,054,907 B2 * | 6/2015 | Abbasfar | H03K 5/135 |
| 9,485,082 B1 | 11/2016 | Sun et al. | |
| 9,503,065 B1 * | 11/2016 | van der Wagt | H03K 5/14 |
| 2015/0318978 A1 * | 11/2015 | Song | H04L 7/0016 375/371 |
| 2016/0087764 A1 | 3/2016 | Tsuchiya | |
| 2020/0274539 A1 * | 8/2020 | Katsuragi | H04L 7/0337 |
| 2020/0304350 A1 | 9/2020 | Yamamoto | |

FOREIGN PATENT DOCUMENTS

| | | |
|---|---|---|
| JP | 2016-063430 | 4/2016 |
| JP | 2018-523380 A | 8/2018 |
| JP | 2020-155848 A | 9/2020 |

* cited by examiner

*Primary Examiner* — Young T. Tse
(74) *Attorney, Agent, or Firm* — Foley & Lardner LLP (57) ABSTRACT

A receiving device includes a first sampling circuit extracting first binary data from a first signal based on a first edge timing of a first clock signal. The receiving device includes a second sampling circuit extracting second binary data from the first signal based on the first edge timing, and further extracting third binary data from the first signal based on a second edge timing of a second clock signal having a phase delayed from a phase of the first clock signal. The receiving device includes a circuit outputting a second signal indicating a phase shift direction of a third clock signal. The receiving device includes a circuit outputting waveform data based on the first binary data and the second binary data or the third binary data. The second sampling circuit selects either the second binary data or the third binary data based on the second signal.

16 Claims, 9 Drawing Sheets

RECEIVING DEVICE, MEMORY SYSTEM, AND METHOD

CROSS-REFERENCE TO RELATED APPLICATION(S)

This application is based upon and claims the benefit of priority from Japanese Patent Application No. 2021-153383, filed Sep. 21, 2021, the entire contents of which are incorporated herein by reference.

FIELD

Embodiments described herein relate generally to a receiving device, a memory system, and a method.

BACKGROUND

In general, a receiving device is configured to receive a transmitted data signal. The receiving device processes the received data signal with a data sampler circuit and an eye monitor sampler circuit. This processing includes monitoring an eye pattern. Waveform shaping of the received data signal is executed by this processing. A memory system can include such a receiving device and store data based on a waveform-shaped data signal. Such a memory system controls the processing by the receiving device.

DETAILED DESCRIPTION

Embodiments provide a receiving device, a memory system, a method capable of properly aligning received data signals.

In general, according to one embodiment, a receiving device includes a first sampling circuit configured to extract first binary data from a first signal based on a first edge timing of a first clock signal. The receiving device includes a second sampling circuit configured to extract second binary data from the first signal based on the first edge timing, and further extract third binary data from the first signal based on a second edge timing of a second clock signal having a phase delayed from a phase of the first clock signal. The receiving device includes a control circuit configured to output, to the second sampling circuit, a second signal indicating a phase shift direction of a third clock signal. The receiving device includes an output circuit configured to output waveform data based on the first binary data and either the second binary data or the third binary data. The second sampling circuit is configured to select either the second binary data or the third binary data based on the second signal indicating the phase shift direction.

A memory system to which a receiving device according to each of the embodiments is applied will be described in detail with reference to the accompanying drawings. The present disclosure is not limited to the embodiments.

First Embodiment

Figure 1:
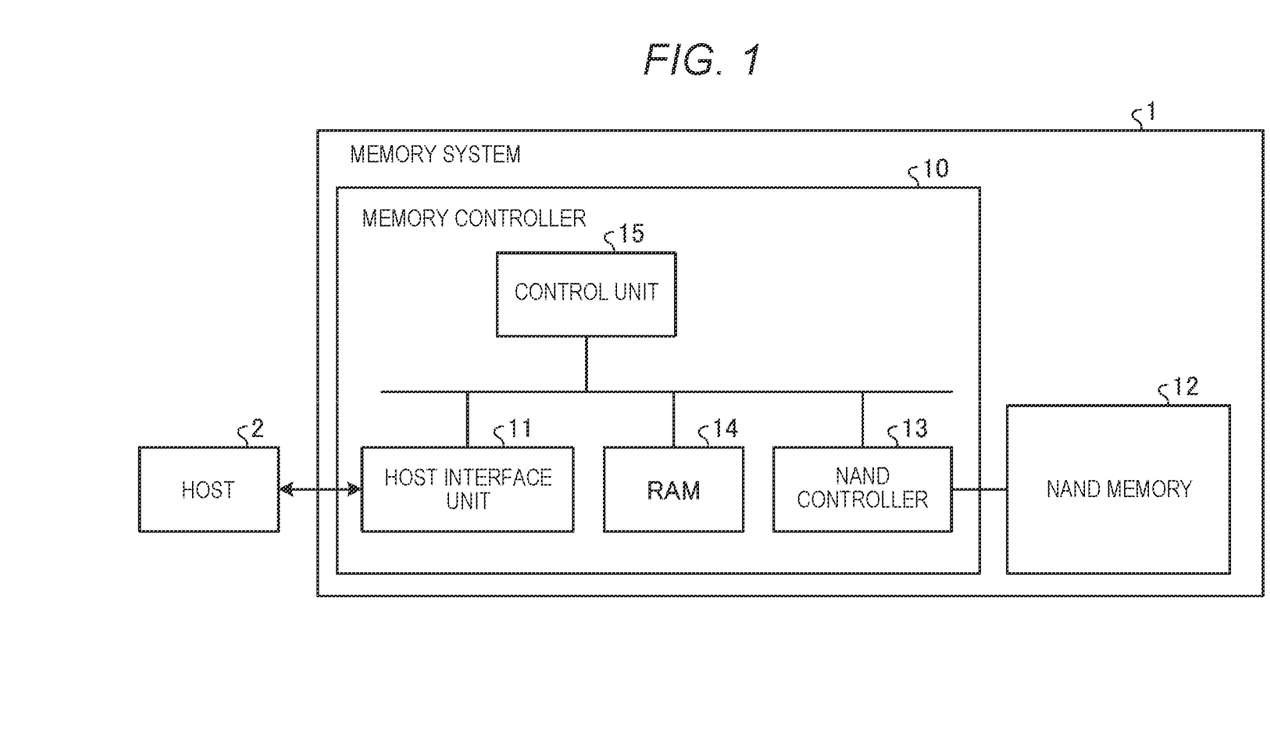
FIG. 1 is a diagram showing an example of a configuration of a memory system according to a first embodiment.

FIG. 1 is a diagram showing an example of a configuration of a memory system according to a first embodiment. A memory system 1 is connectable to a host 2. The memory system 1 communicates data with the host 2 in response to a request from the host 2 in a state of being connected to the host 2.

The host 2 is, for example, an electronic device such as a personal computer, a portable information device, and a server. Instead of an electronic device, the host 2 may also be a processor provided in an electronic device or a circuit having a function of communicating with the memory system 1. As a communication interface standard between the memory system 1 and the host 2, any interface standard may be adopted. Two or more hosts 2 may be connected to the memory system 1. The host 2 and the memory system 1 may be connected via a network.

The memory system 1 includes a NAND type flash memory (hereinafter referred to as a NAND memory) 12 and a memory controller 10. The memory system 1 is, for example, a storage device such as a solid state drive (SSD) and a universal flash storage (UFS) device. The NAND memory 12 is a nonvolatile storage medium that functions as a storage. The NAND memory 12 includes one or more chips. The memory controller 10 includes a host interface unit 11, a NAND controller 13, a random access memory (RAM) 14, and a control unit 15.

The control unit 15 includes, for example, one or more processors. The control unit 15 controls the memory system 1 by executing firmware stored in advance in the memory system 1. A storage location of the program is freely designed. For example, the firmware is stored in advance in the NAND memory 12 and loaded into the RAM 14 during start-up. The control unit 15 executes the firmware loaded in the RAM 14. The memory system 1 is controlled by, for example, a plurality of processes based on the firmware. A part or all of the plurality of processes executed by the control unit 15 may be implemented by a hardware circuit. The control unit 15 may be a control circuit that is a hardware circuit.

The host interface unit 11 is an example of a receiving device. The host interface unit 11 is an interface device for the memory system 1 to communicate with the host 2. For example, the host interface unit 11 transfers user data between the host 2 and the RAM 14 under control by the control unit 15.

The NAND controller 13 is an interface device for accessing the NAND memory 12. The NAND controller 13 transfers the user data or management information between the RAM 14 and the NAND memory 12 under the control by the control unit 15. Although details are omitted, the NAND controller 13 can perform an error correction process.

The RAM 14 is a storage medium for temporarily storing data. The RAM 14 may be implemented in the memory controller 10 or may be provided outside the memory controller 10. As the RAM 14, for example, a storage medium capable of communicating data at a higher speed than the NAND memory 12 may be used. As the RAM 14, for example, a volatile or nonvolatile storage medium may be used. As the RAM 14, for example, a dynamic RAM (DRAM), a static RAM (SRAM), a ferroelectric RAM (FeRAM), a magnetoresistive RAM (MRAM), or a phase change RAM (PRAM), may be used.

Figure 2:
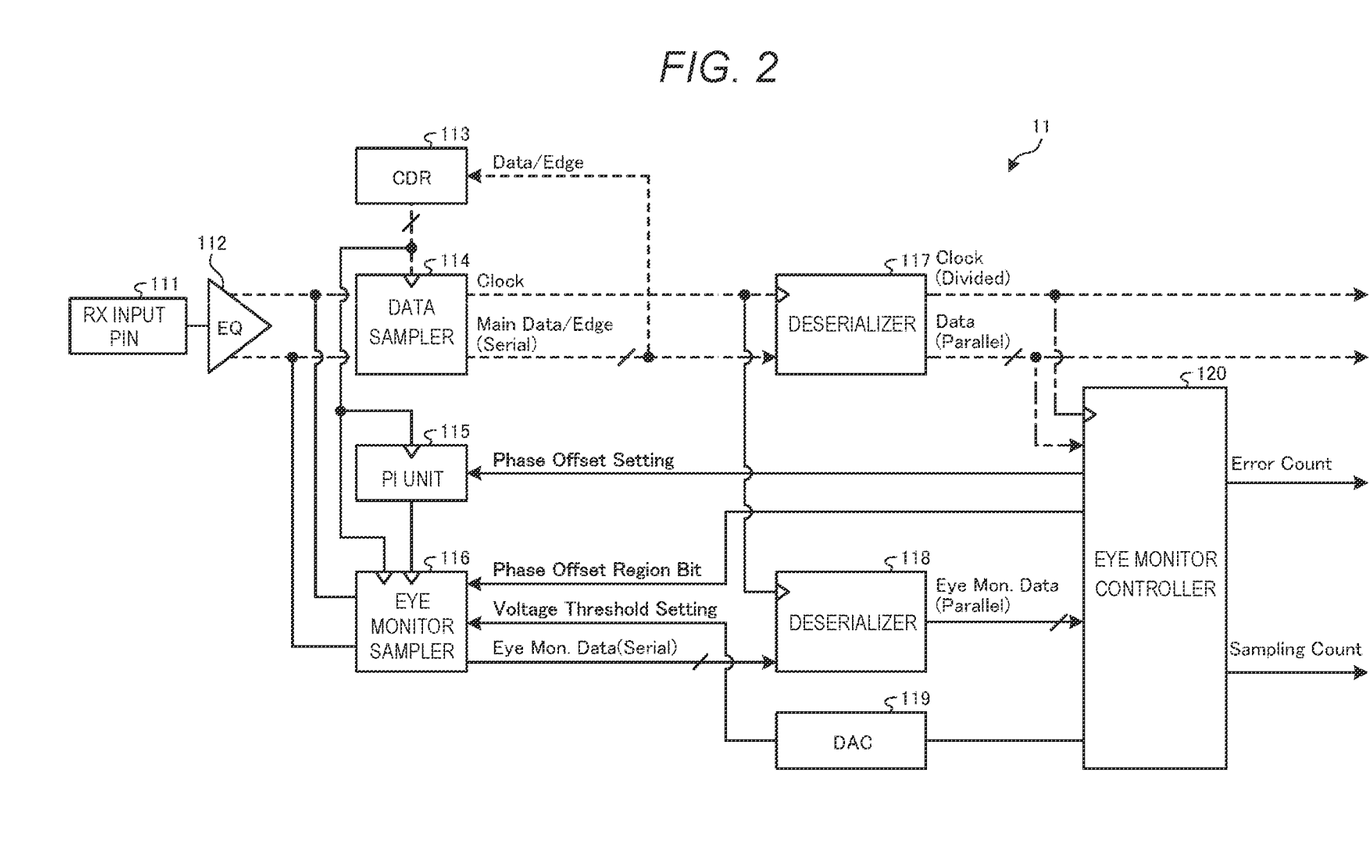
FIG. 2 is a diagram showing a circuit configuration provided in a host interface unit according to the first embodiment.

FIG. 2 is a diagram showing a circuit configuration provided in the host interface unit 11 according to the first embodiment. An RX input pin 111 receives a reception signal. The reception signal is assumed to operate differentially between two lines in, for example, a physical layer of a serial interface. The reception signal is compensated by, for example, an equalizer (EQ) 112 for amplifying a high frequency component thereof, and is then sent to a data sampler 114 and an eye monitor sampler 116.

The data sampler 114 synchronizes with a clock from a clock data recovery (CDR) circuit 113, extracts binary data included in the reception signal based on a reference voltage, and outputs the binary data to a deserializer 117 and the CDR circuit 113. Extracting binary data from a reception signal by the data sampler 114 is also referred to as "sampling" or "acquiring" hereafter.

The CDR circuit 113 separates a clock from the received data, and outputs the separated clock to the data sampler 114, the eye monitor sampler 116, and a PI circuit 115. The CDR circuit 113 reproduces a multiphase clock. The multiphase clock reproduced by the CDR circuit 113 includes a clock CLK_CDR_000, a clock CLK_CDR_090, a clock CLK_CDR_180, and a clock CLK_CDR_270 that are multiple (four in this example) clocks having different phases from each other. The clock CLK_CDR_180 is an example of a first clock signal. The clock CLK_CDR_270 is an example of a second clock signal. Each of the clocks CLK_CDR_000, CLK_CDR_090, CLK_CDR_180, and CLK_CDR_270 in the multiphase clock has an equal phase difference (for example, 90°) from a clock having a closest phase thereto. Phase differences of the clocks CLK_CDR_000, CLK_CDR_090, CLK_CDR_180, and CLK_CDR_270 based on a phase of the clock CLK_CDR_000 are 0°, 90°, 180°, and 270°, respectively.

The PI circuit 115 generates a clock timing signal whose phase is changed with reference to the clock from the CDR circuit 113, and supplies the generated clock timing signal to the eye monitor sampler 116. The PI circuit 115 receives, from an eye monitor controller 120, a control signal (Phase Offset) indicating a timing within a sampling period of a signal to be sampled. The PI circuit 115 supplies, to the eye monitor sampler 116, the clock timing signal generated in response to the control signal.

The eye monitor sampler 116 is a sampling circuit that samples a signal waveform including an aperture portion of an eye pattern in a reception signal. The eye monitor sampler 116 is provided together with the data sampler 114. The eye monitor sampler 116 receives the reception signal processed by the EQ 112. The eye monitor sampler 116 receives the clock timing signal from the PI circuit 115 and the clock from the CDR circuit 113. The eye monitor sampler 116 synchronizes the reception signal processed by the EQ 112 with the clock timing signal from the PI circuit 115 to determine a voltage amplitude level of the reception signal using a reference voltage from a DAC 119, and extracts a determination result as binary data in synchronization with the clock from the CDR circuit 113. The eye monitor sampler 116 outputs extracted reception data to a deserializer 118.

The deserializer 117 and the deserializer 118 convert the input reception signal into parallel data and output the parallel data. The DAC 119 receives, from the eye monitor controller 120, a control signal indicating a reference voltage, and outputs the reference voltage corresponding to the control signal to the eye monitor sampler 116.

The eye monitor controller 120 is an example of a control circuit and an output circuit. The eye monitor controller 120 sets a phase and a voltage during sampling of a signal to be processed by the eye monitor sampler 116, and outputs a control signal indicating setting contents. Details of the control signal will be described later. The eye monitor controller 120 generates eye monitor data of the entire reception signal including the aperture portion of the eye pattern based on the data output from the data sampler 114 and the data output from the eye monitor sampler 116. The eye monitor controller 120 generates the eye monitor data that is data obtained by superimposing a large number of pieces of waveform data on a coordinate plane developed with a voltage as a vertical axis and a phase as a horizontal axis. In order to generate the eye monitor data, the eye monitor controller 120 outputs, to the PI circuit 115 or the DAC 119, a control signal indicating a phase or a voltage of a signal to be extracted. The eye monitor controller 120 outputs, to the eye monitor sampler 116, a signal (Phase Offset Region Bit) indicating a setting range by a phase control signal related to the signal to be extracted.

In order to output appropriate waveform data, it is desired for the host interface unit 11 to align the data output from the data sampler 114 and the eye monitor sampler 116.

For example, bit pattern signals output from the data sampler 114 and the eye monitor sampler 116 should be aligned. In this case, an alignment circuit aligns the bit pattern signals output from the data sampler 114 and the eye monitor sampler 116 in synchronization with one of clocks used by the data sampler 114 and the eye monitor sampler 116. When the alignment circuit is located downstream of an output side of the deserializers 117 and 118, a deviation of a bit pattern is large. Then, an arithmetic and logical processing amount for absorbing this deviation increases, which leads to an increase in a circuit area and power consumption. Therefore, in the host interface unit 11, the data output from the data sampler 114 and the eye monitor sampler 116 is aligned upstream of the deserializers 117 and 118 (that is, upstream of an input side of the deserializers 117 and 118) to prevent the increase in the circuit area and power consumption.

Figure 3:
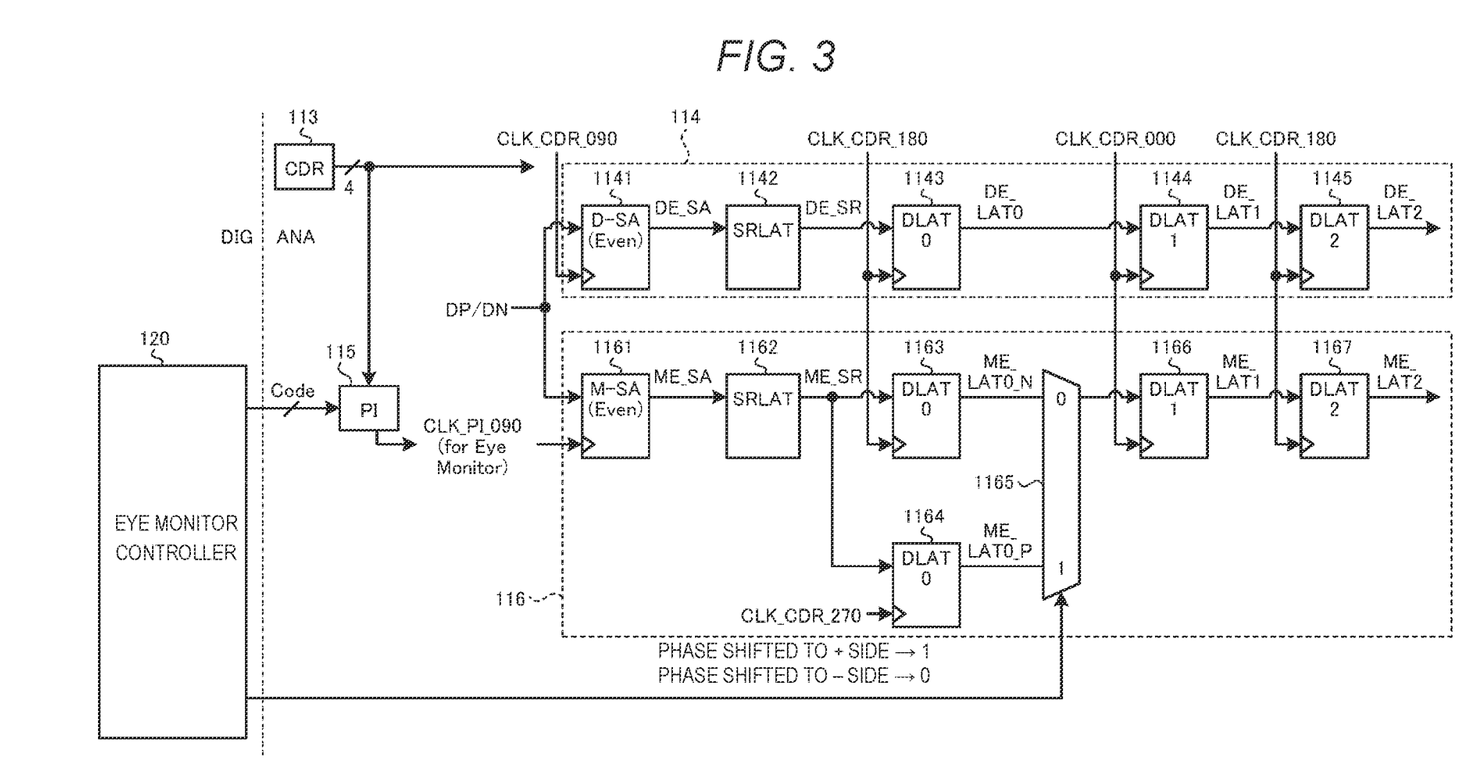
FIG. 3 is a diagram showing a circuit configuration of a data sampler and an eye monitor sampler according to the first embodiment.

Next, a circuit configuration of the data sampler 114 and the eye monitor sampler 116 according to the first embodiment will be described with reference to FIG. 3. FIG. 3 is a diagram showing the circuit configuration of the data sampler 114 and the eye monitor sampler 116 according to the first embodiment.

The data sampler 114 includes a circuit 1141, a circuit 1142, a circuit 1143, a circuit 1144, and a circuit 1145. The eye monitor sampler 116 includes a circuit 1161, a circuit 1162, a circuit 1163, a circuit 1164, a multiplexer 1165, a circuit 1166, and a circuit 1167.

The circuit configuration shown in FIG. 3 process Even data. The Even data is data sampled by even-numbered clocks in basic clocks. By extracting only even-numbered data, the data sampler 114 and the eye monitor sampler 116 can reduce an amount of data to be extracted and can reduce the power consumption compared with a case of extracting odd-numbered data as well. The circuits 1141 and 1161 are sense amplifier circuits that convert reception signals DP/DN into binary data. The circuit 1141 outputs a signal DE SA that is converted in synchronization with the clock CLK_CDR_090 from the CDR circuit 113. The circuit 1161 outputs a signal ME_SA that is converted in synchronization with a clock CLK_PI_090 corresponding to the clock timing signal from the PI circuit 115. The clock CLK_PI_090 is an example of a third clock signal. The PI circuit 115 outputs a clock signal to the circuit 1161 in response to a code (for example, Phase Offset) indicating a control signal from the eye monitor controller 120.

The circuit 1142 and the circuit 1162 are SR latch circuits. The circuit 1142 receives the signal DE SA and outputs a signal DE_SR. The circuit 1162 receives the signal ME_SA and outputs a signal ME_SR. The circuit 1162 outputs the signal ME_SR to the circuit 1163 and the circuit 1164.

The circuits 1143, 1163, and 1164 are D latch circuits. The circuit 1143 receives the signal DE_SR and outputs a signal DE_LAT0 in response to receiving the clock CLK_CDR_180. The circuit 1163 receives the signal ME_SR and outputs a signal ME_LAT0_N in response to receiving the clock CLK_CDR_180. The circuit 1164 receives the signal ME_SR and outputs a signal ME_LAT0_P in response to receiving the clock CLK_CDR_270.

The multiplexer 1165 receives the output of the circuit 1163 and the circuit 1164, receives a control signal (Phase Offset Region Bit) indicating a phase setting range of the clock CLK_PI_090 from the eye monitor controller 120, and outputs the output signal of either the circuit 1163 or the circuit 1164 based on this control signal. With respect to a phase of the clock CLK_CDR_090, when a phase of the clock CLK_PI_090 is shifted to a + side (delayed), the Phase Offset Region Bit is "1", and when the phase of the clock CLK_PI_090 is shifted to a − side (advanced), the Phase Offset Region Bit is "0".

The multiplexer 1165 outputs the output signal of the circuit 1164 when the control signal (Phase Offset Region Bit) indicates the phase is shifted to the + side, and outputs the output signal of the circuit 1163 when the control signal (Phase Offset Region Bit) indicates the phase is shifted to the − side.

The circuits 1144 and 1166 are D latch circuits. The circuit 1144 outputs a signal DE_LAT1 in response to receiving the clock CLK_CDR_000. The circuit 1166 outputs a signal ME_LAT1 in response to receiving the clock CLK_CDR_000. The circuits 1145 and 1167 are D latch circuits. The circuit 1145 outputs a signal DE_LAT2 in response to receiving the clock CLK_CDR_180. The circuit 1167 outputs a signal ME_LAT2 in response to receiving the clock CLK_CDR_180.

Figure 4:
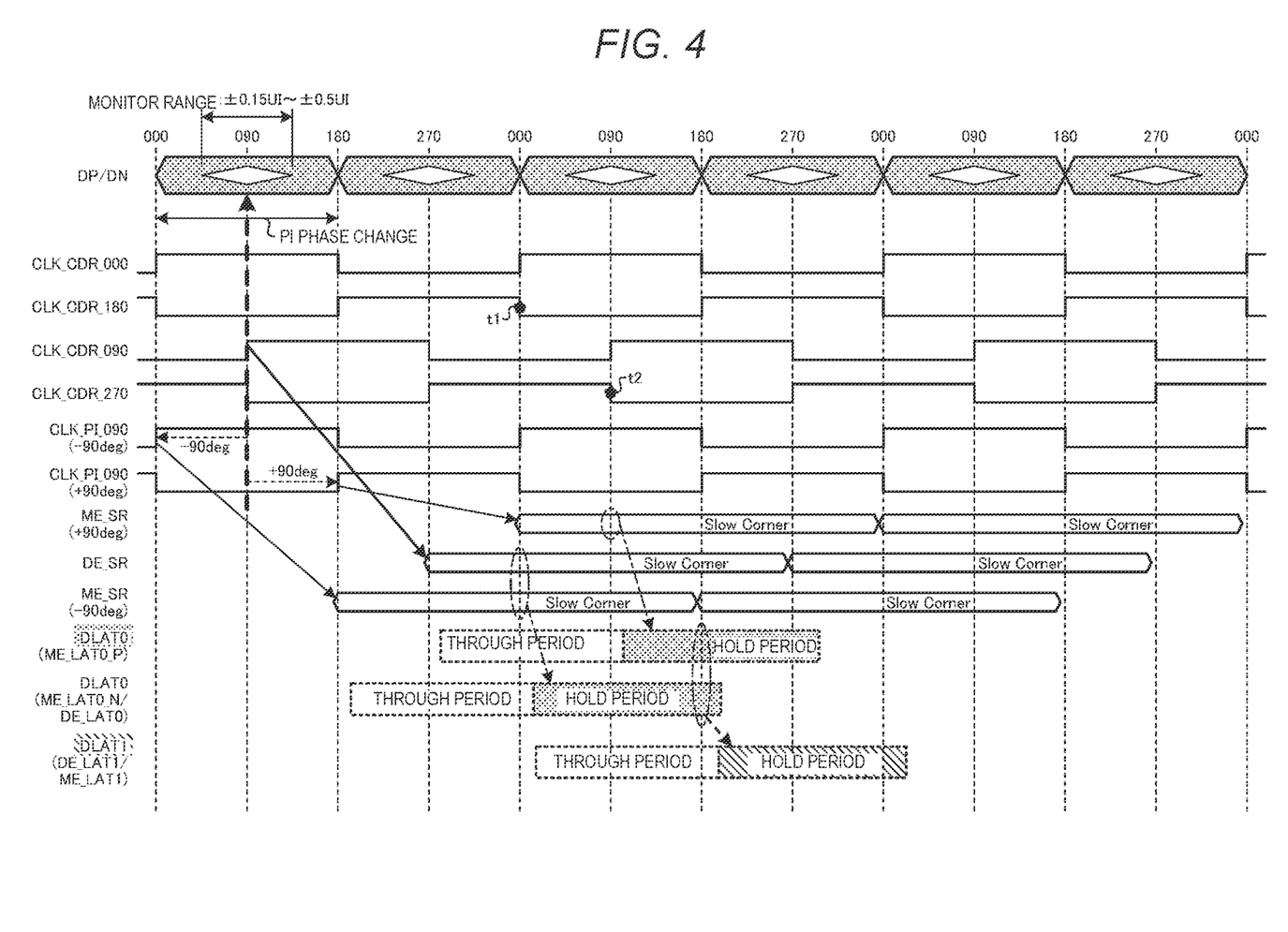
FIG. 4 is a timing chart of operations of the data sampler and the eye monitor sampler according to the first embodiment.

Operations of the host interface unit 11 according to the first embodiment will be described with reference to FIG. 4. FIG. 4 shows a timing chart of the operations of the data sampler 114 and the eye monitor sampler 116 in the host interface unit 11. The timing chart shown in FIG. 4 shows rising timings and falling timings of the clocks CLK_CDR_000, CLK_CDR_090, CLK_CDR_180, and CLK_CDR_270 which are received by the data sampler 114 and the eye monitor sampler 116. The timing chart shown in FIG. 4 also shows a rising timing and a falling timing of the clock CLK_PI_90 received by the eye monitor sampler 116. Further, the timing chart shown in FIG. 4 shows various signal states regarding timings of acquiring the signal DE_SR and the signal ME_SR. The signal DE_SR and the signal ME_SR are slow corner signals. The slow corner signals refer to signals that match process conditions, voltage, and temperature (PVT conditions) of a transistor.

The circuit 1143, which is a D latch circuit for the signal DE_SR, receives the signal DE_SR and holds the received signal DE_SR to output the signal DE_LAT0 (first binary data) at a timing t1 (first edge timing) at which the clock CLK_CDR_180 falls. The circuit 1163, which is one D latch circuit for the signal ME_SR, receives the signal ME_SR (−90 deg) and holds the received signal ME_SR to output the signal ME_LAT0_N (second binary data) at the timing t1. The circuits 1143 and 1163 hold the received signals during a holding period. The circuit 1164, which is the other D latch circuit for the signal ME_SR, receives the signal ME_SR (+90 deg) and holds the received signal ME_SR to output the signal ME_LAT0_P (third binary data) at a timing t2 (second edge timing) at which the clock CLK_CDR_270 falls. The circuits 1164 holds the received signal during a holding period. The multiplexer 1165 outputs the signal ME_LAT0_P, which is an output signal of the circuit 1164, when the control signal indicates that the phase is shifted to the + side, and outputs the signal ME_LAT0_N, which is an output signal of the circuit 1163, when the control signal indicates that the phase is shifted to the − side. The circuit 1143 outputs the signal DE_LAT0. When the signal ME_SR (+90 deg) is acquired at the timing t1, the signal ME_SR cannot be acquired properly due to insufficient setup time of the D latch circuit. Therefore, the multiplexer 1165 outputs the output signal of the circuit 1164 when the control signal indicates that the phase is shifted to the + side.

The circuit 1144 receives the signal DE_LAT0 and outputs the signal DE_LAT1 during through period, then holds the received signal DE_LAT0 at a timing at which the clock CLK_CDR_000 falls. The circuit 1166 receives the signal ME_LAT0_N or the signal ME_LAT0_P and outputs the signal ME_LAT1 during through period, then holds the received signal ME_LAT0_N or ME_LAT0_P at a timing at which the clock CLK_CDR_000 falls.

Figure 5:
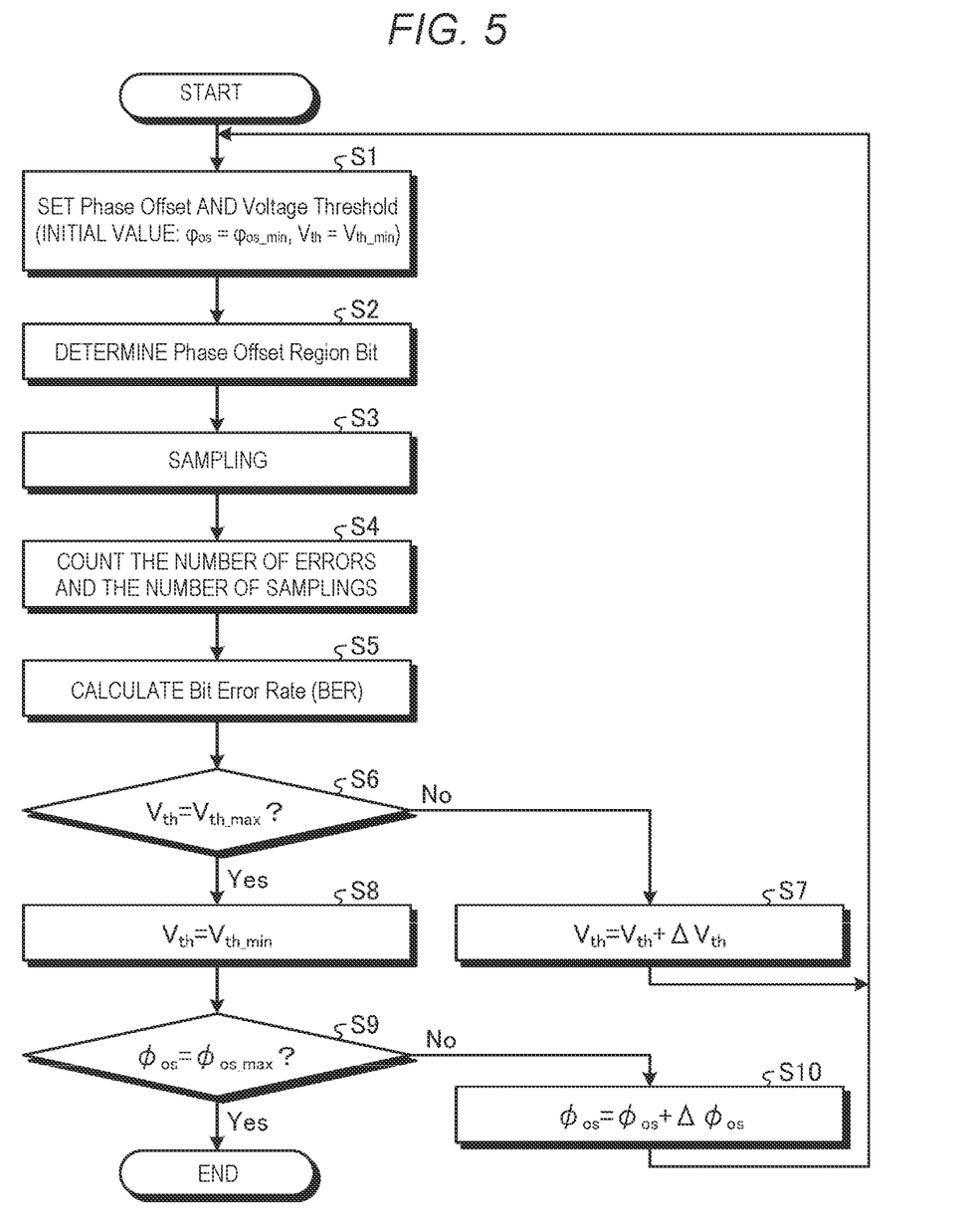
FIG. 5 is a flowchart showing a processing procedure of an eye monitor operation according to the first embodiment.
Figure 6:
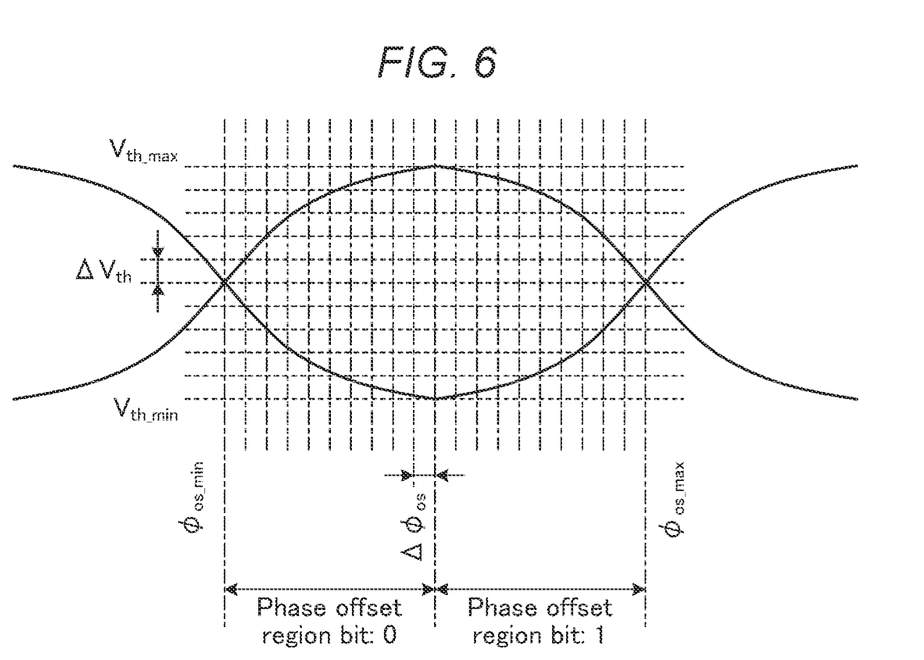
FIG. 6 is a diagram showing an example of various threshold values according to the first embodiment.

Next, a processing procedure by the host interface unit 11 will be described with reference to FIGS. 5 and 6. FIG. 5 is a flowchart showing a processing procedure of eye monitor operations.

The eye monitor controller 120 sets Phase Offset ($\varphi_{os}$) and Voltage Threshold ($V_{th}$) (S1). The Phase Offset is a phase offset value. This phase offset value indicates a timing within a sampling period for a signal to be sampled. The Voltage Threshold is a threshold value of a reference voltage and is a voltage value for the signal to be sampled. As will be described later, the eye monitor controller 120 can generate eye monitor data by sequentially changing values of the Phase Offset and the Voltage Threshold and sampling the values.

The eye monitor controller 120 sets, for example, an initial value. Here, FIG. 6 shows an example of the Phase Offset and the Voltage Threshold. A vertical direction indicates a voltage, and a horizontal direction indicates a phase. The eye monitor controller 120 sets $V_{th\_min}$ as an initial value of the Voltage Threshold. The eye monitor controller 120 sets $\varphi_{os\_min}$ as an initial phase offset value.

As shown in FIG. 5, the eye monitor controller 120 determines the Phase Offset Region Bit based on the set phase offset value (S2). The Phase Offset Region Bit is a value indicating a phase shift direction of the clock CLK_PI_090 with respect to the clock CLK_CDR_090. For example, when the Phase Offset is 0° or more and less than 90°, the eye monitor controller 120 sets the Phase Offset Region Bit to 0. When the Phase Offset is 90° or more and 180° or less, the eye monitor controller 120 sets the Phase Offset Region Bit to 1. The eye monitor controller 120 outputs the set Phase Offset Region Bit as a control signal to the eye monitor sampler 116.

The data sampler 114 and the eye monitor sampler 116 sample based on the input multiple clocks (S3). The eye monitor controller 120 counts the number of times that a result of comparing the signal acquired from the data sampler 114 and the signal acquired from the eye monitor sampler 116 is an error (the number of errors), and counts the number of samplings (S4). When the result of comparing is an error, it means that the result of comparing is not matching.

The eye monitor controller 120 calculates Bit Error Rate based on the number of errors and the number of samplings (S5). This Bit Error Rate is represented by a value obtained by dividing the number of bits in which an error occurs by a total number of transmitted bits. When $V_{th}$ is not $V_{th\_max}$ shown in FIG. 6 (S6: No), $\Delta V_{th}$ is added to $V_{th}$ (S7) and the process proceeds to S1.

When $V_{th}$ is $V_{th\_max}$ (S6: Yes), the eye monitor controller 120 sets $V_{th}$ to $V_{th\_min}$ (S8). When $\varphi_{os}$ is not $\varphi_{os\_max}$ shown in FIG. 6 (S9: No), $\Delta \varphi_{os}$ is added to $\varphi_{os}$ (S10), and the process proceeds to S1. When $\varphi_{os}$ is $\varphi_{os\_max}$ (S9: Yes), the process ends.

Figure 7:
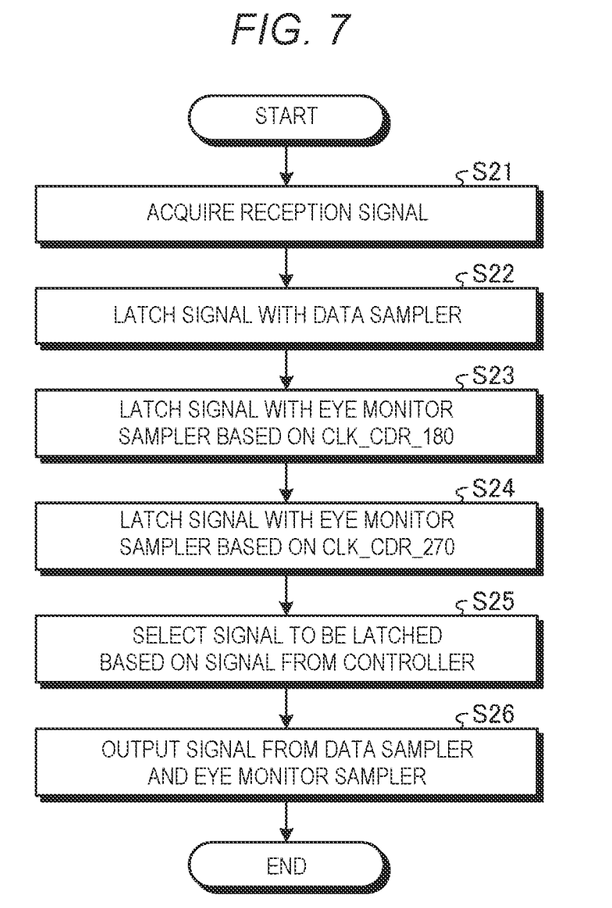
FIG. 7 is a flowchart showing a processing procedure of a sampling process according to the first embodiment.

Here, a processing procedure in the sampling of S3 shown in FIG. 5 will be described with reference to FIG. 7. FIG. 7 is a flowchart showing the processing procedure of the sampling process. The data sampler 114 and the eye monitor sampler 116 acquire a reception signal (S21). The data sampler 114 latches the reception signal with the circuits 1143, 1144, and 1145 in synchronization with corresponding clocks respectively supplied to the circuits 1143, 1144, and 1145 (S22). The circuit 1143 in the data sampler 114 latches the reception signal in synchronization with the clock CLK_CDR_180.

The circuit 1163 in the eye monitor sampler 116 latches the reception signal in synchronization with the clock CLK_CDR_180 (S23). The circuit 1164 latches the reception signal in synchronization with the clock CLK_CDR_270 (S24). The multiplexer 1165 outputs the output signal of the circuit 1164 when the control signal indicates that the phase is shifted to the + side, and outputs the output signal of the circuit 1163 when the control signal indicates that the phase is shifted to the – side (S25). The circuit 1166 and the circuit 1167 latch the reception signal in synchronization with corresponding clocks supplied thereto. In S23 to S25, the host interface unit 11 aligns reception signals latched in synchronization with corresponding clocks by selecting the reception signals according to the phase shift side indicated by the control signal.

The multiplexer 1165 receives outputs of the circuit 1163 and the circuit 1164, receives a control signal from the eye monitor controller 120, and outputs the output signal of either the circuit 1163 or the circuit 1164 based on the control signal. The data sampler 114 and the eye monitor sampler 116 each output a signal processed thereby (S26).

In the host interface unit 11, the data sampler 114 extracts a reception signal in synchronization with the clock CLK_CDR_180. The eye monitor sampler 116 extracts a reception signal in synchronization with the clock CLK_CDR_180 and extracts a reception signal in synchronization with the clock CLK_CDR_270, and outputs the reception signal synchronized with the clock CLK_CDR_270 when the control signal indicates that the phase is shifted to the + side, and outputs the reception signal synchronized with the clock CLK_CDR_180 when the control signal indicates that the phase is shifted to the – side.

In this way, the circuit 1143 in the data sampler 114 and the circuit 1163 in the eye monitor sampler 116 acquire the reception signal in synchronization with the same clock CLK_CDR_180 in the host interface unit 11. Additionally, in the host interface unit 11, the circuit 1164 in the eye monitor sampler 116 acquires the reception signal in synchronization with the clock CLK_CDR_270 at a timing delayed than a timing at which the reception signal is extracted by the circuit 1143 in the data sampler 114. When the phase shift direction is a direction in which the phase is advanced, the acquired signal by the circuit 1143 and the acquired signal by the circuit 1163 are processed. When the phase shift direction is a direction in which the phase is delayed, the acquired signal by the circuit 1143 and the acquired signal by the circuit 1164 are processed. Therefore, the host interface unit 11 can ensure that the eye monitor sampler 116 can reliably extract the reception signal. Since the data sampler 114 and the eye monitor sampler 116 extract reception signals in synchronization with the clock CLK_CDR_180 in each output stage, and the extracted data is aligned at a stage with less bit pattern deviation rather than downstream of the data sampler 114 and the eye monitor sampler 116, such as the deserializers, the host interface unit 11 can prevent the increase in the circuit area and power consumption.

The host interface unit 11 extracts the reception signal based on a timing of the multi-phase clock, so that the reception signal can be sampled at a timing at which the eye monitor sampler 116 can reliably extract the reception signal.

Second Embodiment

Figure 8:
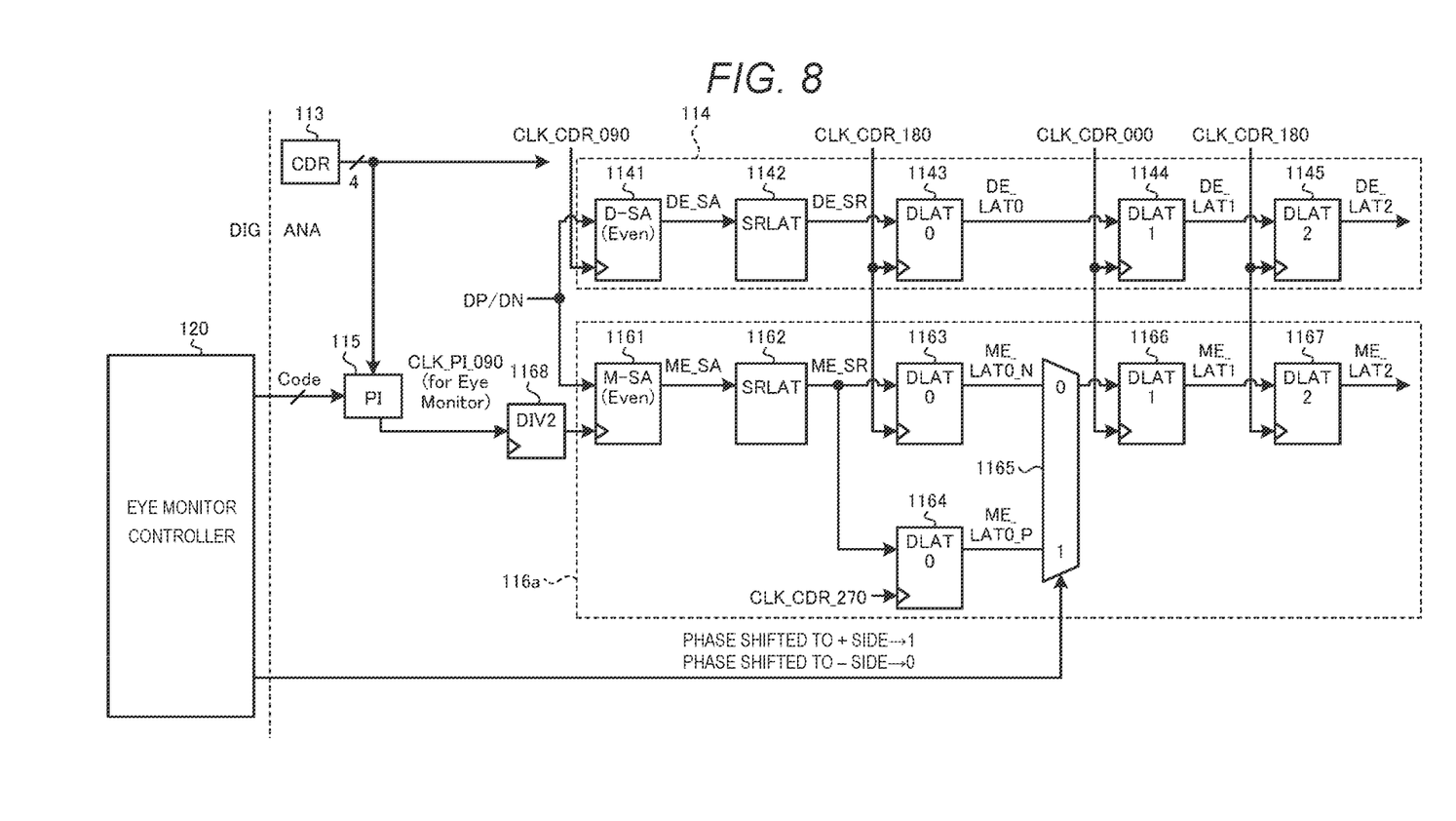
FIG. 8 is a diagram showing a circuit configuration of a data sampler and an eye monitor sampler according to a second embodiment.

FIG. 8 shows circuit a configuration of the data sampler 114 and an eye monitor sampler 116a provided in a host interface unit 11a according to a second embodiment. In FIG. 8, the same elements as those of the data sampler 114 and the eye monitor sampler 116 shown in FIG. 3 are designated by the same reference numerals.

The eye monitor sampler 116a of the second embodiment includes a frequency divider circuit 1168. The frequency divider circuit 1168 divides a frequency of an input clock timing signal by half.

Figure 9:
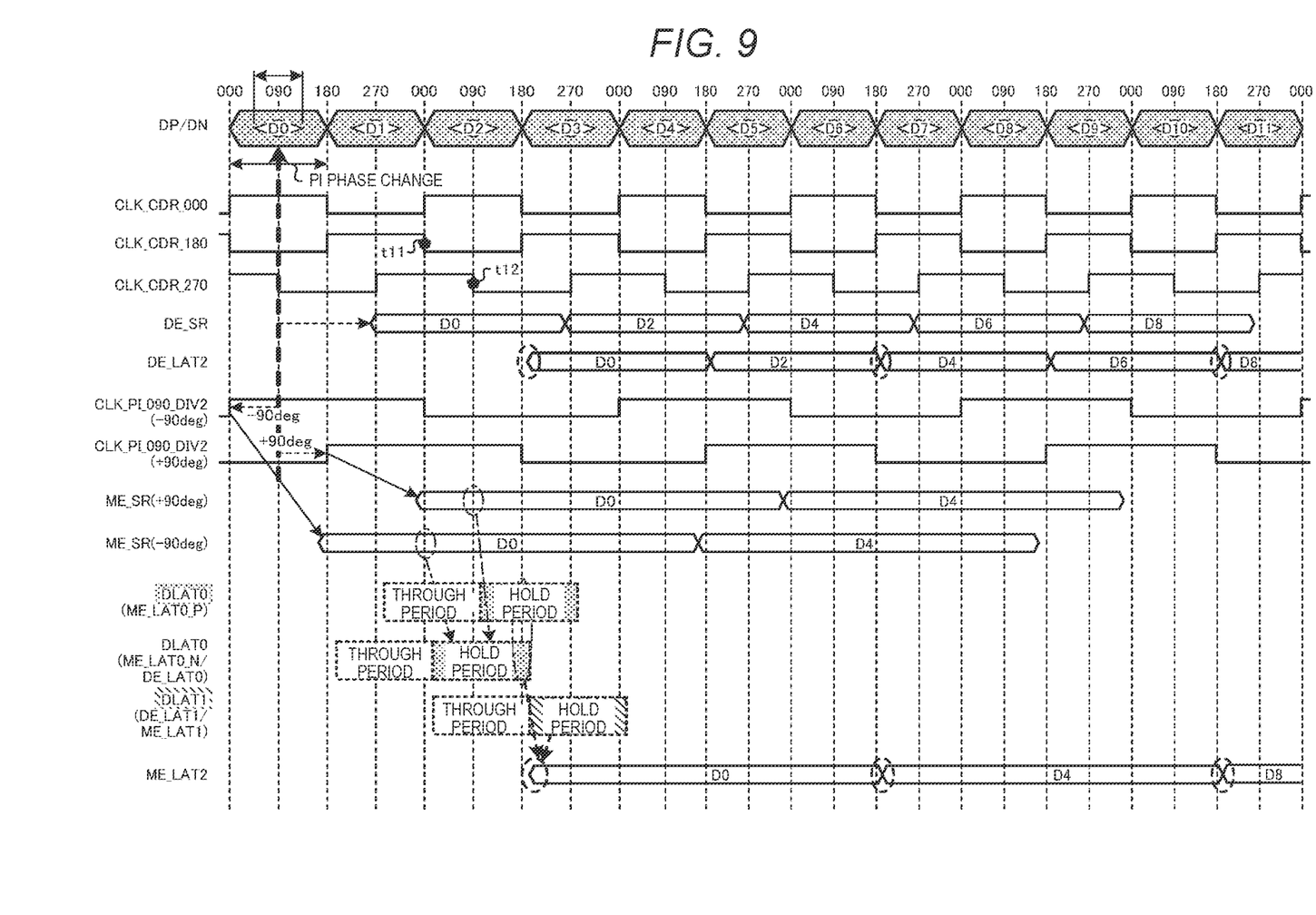
FIG. 9 is a timing chart of operations of the data sampler and the eye monitor sampler according to the second embodiment.

FIG. 9 shows a timing chart of operations of the data sampler 114 and the eye monitor sampler 116a in the host interface unit 11a according to the second embodiment. The timing chart shown in FIG. 9 shows rising and falling timings of the clock CLK_CDR_000, the clock CLK_CDR_180, and the clock CLK_CDR_270 which are received by the data sampler 114 and the eye monitor sampler 116a. The timing chart shown in FIG. 9 shows rising and falling timings of a clock CLK_PI_090_DIV2 received by the eye monitor sampler 116a. Further, the timing chart shown in FIG. 9 shows various signal states regarding timings of acquiring the signals DE_SR, DE_LAT2, and ME_SR.

The circuit 1143, which is a D latch circuit for the signal DE_SR, acquires and holds the signal DE_SR at a timing t11 at which the clock CLK_CDR_180 falls. The circuit 1163, which is one D latch circuit for the signal ME_SR, acquires and holds the signal ME_SR (–90 deg) at the timing t11. The circuit 1164, which is the other D latch circuit for the signal ME_SR, acquires the signal ME_SR (+90 deg) at a timing t12 at which the clock CLK_CDR_270 falls, and holds the acquired signal ME_SR (+90 deg). The multiplexer 1165 outputs the signal ME_LAT0_P, which is an output signal of the circuit 1164, when the control signal indicates that the phase is shifted to the + side, and outputs the signal ME_LAT0_N, which is an output signal of the circuit 1163, when the control signal indicates that the phase is shifted to the − side. Since the frequency divider circuit 1168 divides the frequency of the clock timing signal by half, data extracted by the eye monitor sampler 116a can be thinned out. When only Even data is extracted and the frequency of the clock timing signal is divided by half, the extracted data can be reduced to ¼.

The circuit 1144 receives the signal DE_LAT0 at a timing at which the clock CLK_CDR_000 falls, and outputs the signal DE_LAT1. The circuit 1166 receives the signal ME_LAT0_N or the signal ME_LAT0_P at a timing at which the clock CLK_CDR_000 falls, and outputs the signal ME_LAT1.

In this way, the eye monitor sampler 116a can thin out the data extracted by the eye monitor sampler 116a by dividing the frequency of the clock timing signal by the frequency divider circuit 1168. As a result, the memory system 1 can reduce processing load of the data extracted by the eye monitor sampler 116a, and can reduce power consumption of the memory system 1.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A receiving device comprising:
    a first sampling circuit configured to extract first binary data from a first signal based on a first edge timing of a first clock signal;
    a second sampling circuit configured to extract second binary data from the first signal based on the first edge timing, and further extract third binary data from the first signal based on a second edge timing of a second clock signal having a phase delayed from a phase of the first clock signal;
    a control circuit configured to output, to the second sampling circuit, a second signal indicating a phase shift direction of a third clock signal; and
    an output circuit configured to output waveform data based on the first binary data and either the second binary data or the third binary data, wherein
    the second sampling circuit is configured to select either the second binary data or the third binary data based on the second signal indicating the phase shift direction.

2. The receiving device according to claim 1, further comprising:
    a shift circuit configured to shift a phase of the third clock signal based on a control signal from the control circuit.

3. The receiving device according to claim 1, further comprising:
    a frequency divider circuit configured to divide a frequency of an input clock signal to generate the third clock signal.

4. The receiving device according to claim 1, further comprising:
    a circuit configured to generate a multi-phase clock signal including the first clock signal and the second clock signal.

5. The receiving device according to claim 1, wherein the first sampling circuit includes one or more first latch circuits configured to latch the first signal in synchronization with the first clock signal.

6. The receiving device according to claim 1, wherein the second sampling circuit includes a second latch circuit configured to latch the first signal in synchronization with the first clock signal and a third latch circuit configured to latch the first signal in synchronization with the second clock signal.

7. The receiving device according to claim 1, wherein the phase shift direction is represented as a first value and a second value when a phase of the third clock signal is delayed and advanced, respectively.

8. A memory system connectable to a host, the memory system comprising:
    a receiving device configured to receive data from a host; and
    a nonvolatile memory configured to store data based on an output of the receiving device; wherein the receiving device comprises:
        a first sampling circuit configured to extract first binary data from a first signal based on a first edge timing of a first clock signal;
        a second sampling circuit configured to extract second binary data from the first signal based on the first edge timing, and further extract third binary data from the first signal based on a second edge timing of a second clock signal having a phase delayed from a phase of the first clock signal;
        a control circuit configured to output, to the second sampling circuit, a second signal indicating a phase shift direction of a third clock signal; and
        an output circuit configured to output waveform data based on the first binary data and either the second binary data or the third binary data, wherein
        the second sampling circuit is configured to select either the second binary data or the third binary data based on the second signal indicating the phase shift direction.

9. The memory system according to claim 8, wherein the receiving device further comprising:
    a shift circuit configured to shift a phase of the third clock signal based on a control signal from the control circuit.

10. The memory system according to claim 8, wherein the receiving device further comprising:
    a frequency divider circuit configured to divide a frequency of an input clock signal to generate the third clock signal.

11. The memory system according to claim 8, wherein the receiving device further comprising:
    a circuit configured to generate a multi-phase clock signal including the first clock signal and the second clock signal.

12. The memory system according to claim 8, wherein the first sampling circuit includes one or more first latch circuits configured to latch the first signal in synchronization with the first clock signal.

13. The memory system according to claim 8, wherein the second sampling circuit includes a second latch circuit configured to latch the first signal in synchronization with the first clock signal and a third latch circuit configured to latch the first signal in synchronization with the second clock signal.

14. The memory system according to claim 8, wherein the phase shift direction is represented as a first value and a second value when a phase of the third clock signal is delayed and advanced, respectively.

15. A method, comprising:
- extracting first binary data from an input signal based on a first edge timing of a first clock signal;
- extracting second binary data from the input signal based on the first edge timing;
- extracting third binary data from the input signal based on a second edge timing of a second clock signal having a phase delayed from a phase of the first clock signal; and
- outputting waveform data based on the first binary data and either the second binary data or the third binary data selected based on a phase shift direction of a third clock signal.

16. The method according to claim 15, wherein the phase shift direction is represented as a first value and a second value when a phase of the third clock signal is delayed and advanced, respectively.

\* \* \* \* \*